(12) United States Patent
Yue et al.

(10) Patent No.: US 10,042,098 B2
(45) Date of Patent: Aug. 7, 2018

(54) POLARIZER, METHOD FOR MANUFACTURING POLARIZER, AND DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Qin Yue, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 470 days.

(21) Appl. No.: 14/981,845

(22) Filed: Dec. 28, 2015

(65) Prior Publication Data
US 2016/0187723 A1    Jun. 30, 2016

(30) Foreign Application Priority Data
Dec. 30, 2014    (CN) .......................... 2014 1 0843523

(51) Int. Cl.
*G02F 1/1335* (2006.01)
*G02B 5/30* (2006.01)

(52) U.S. Cl.
CPC ....... *G02B 5/305* (2013.01); *G02F 1/133528* (2013.01); *G02F 2201/54* (2013.01)

(58) Field of Classification Search
CPC ................................................. G02F 1/133528
USPC ............................................................. 349/96
See application file for complete search history.

(56) References Cited

U.S. PATENT DOCUMENTS

2014/0098331 A1* 4/2014 Hisanaga ............... G02B 1/105
349/96

FOREIGN PATENT DOCUMENTS

CN           101526637 B       2/2011

* cited by examiner

*Primary Examiner* — Phu Vu
(74) *Attorney, Agent, or Firm* — Alston & Bird LLP

(57) ABSTRACT

A polarizer, a method for manufacturing a polarizer, a display panel including a polarizer, and a display device are provided. The polarizer includes: a first transparent layer; a second transparent layer; a polarizing layer, disposed between the first transparent layer and the second transparent layer; and a first organic layer disposed between the first transparent layer and the polarizing layer, where a direction of a shrinkage stress of the first organic layer is perpendicular to a direction of a shrinkage stress of the polarizing layer.

20 Claims, 4 Drawing Sheets

POLARIZER, METHOD FOR MANUFACTURING POLARIZER, AND DISPLAY PANEL

CROSS REFERENCE TO RELATED APPLICATIONS

This application claims priority to Chinese Patent Application No. 201410843523.2, entitled "POLARIZER, METHOD FOR MANUFACTURING POLARIZER, DISPLAY PANEL, AND DISPLAY DEVICE", filed with the Chinese Patent Office on Dec. 30, 2014, which is incorporated by reference in its entirety herein.

FIELD OF THE INVENTION

The present application relates to the field of optics, particularly to a polarizer, a method for manufacturing a polarizer, and a display panel including a polarizer.

BACKGROUND OF THE INVENTION

In recent years, due to a lighter and thinner display screen and an increased contrast of the display screen, a high-quality polarizer is required for the display screen. Both a small-size display screen and a large-size display screen need a thin polarizer to achieve a lighter and thinner display screen.

However, for a thin display panel, some problems may occur in a manufacture process when a polarizer is attached onto the glass of the panel. For example, an upper polarizer or a lower polarizer of the display panel may be shrinked due to affects of heat or moisture, which may be prone to produce a shrinkage stress in the polarizer, to cause problems such as warping of the display panel.

In this way, in the case that a processing difficulty is not increased, a method for manufacturing a display panel not apt to warp or negatively warp is demanded.

BRIEF SUMMARY OF THE INVENTION

In view of this, a polarizer is provided according to an embodiment of the disclosure, including:
 a first transparent layer;
 a second transparent layer, disposed opposite to the first transparent layer;
 a polarizing layer, disposed between the first transparent layer and the second transparent layer; and
 a first organic layer, disposed between the first transparent layer and the polarizing layer; or a second organic layer, disposed between the second transparent layer and the polarizing layer,
 where a direction of a shrinkage stress of the first organic layer or the second organic layer is perpendicular to a direction of a shrinkage stress of the polarizing layer.

A display panel is provided according to the disclosure, including:
 a first substrate;
 a second substrate, disposed opposite to the first substrate;
 a liquid crystal layer, packaged between the first substrate and the second substrate;
 a first polarizer, disposed on a surface, away from the second substrate, of the first substrate;
 a second polarizer, disposed on a surface, away from the first substrate, of the second substrate,
 where a direction of a shrinkage stress of the first polarizer is the same as a direction of a shrinkage stress of the second polarizer.

A method for manufacturing a polarizer is further provided according to the disclosure, including:
 providing a polarizing layer;
 forming a first organic layer on a surface of the polarizing layer, where a direction of a shrinkage stress of the first organic layer is perpendicular to a direction of a shrinkage stress of the polarizing layer;
 forming a first transparent layer on a surface, away from the polarizing layer, of the first organic layer; and
 forming a second transparent layer on another surface of the polarizing layer.

Compared with the related art, the disclosure has following advantages.

The polarizer according to the disclosure includes a dyed polarizing layer and an undyed first organic layer, where a direction of a shrinkage stress of the first organic layer is perpendicular to a direction of a shrinkage stress of the polarizing layer. In this way, the polarizer is not easy to warp, in the case that an optical effect of the polarizer is not affected. In the case that an outer surface of a display panel is attached with two such polarizers, shrinkage stresses of the two polarizers get balanced, which enables the display panel not apt to warp.

BRIEF DESCRIPTION OF THE DRAWINGS

Detailed description of embodiments referring to following drawings makes purposes, features and advantages of the disclosure more prominent.

DETAILED DESCRIPTION OF THE INVENTION

Figure 1:
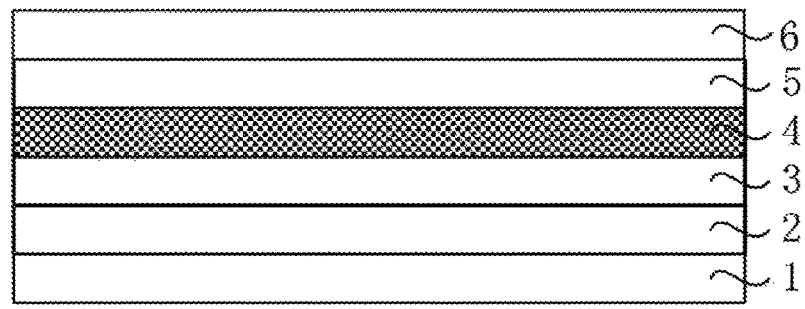
FIG. 1 is a cross-sectional diagram of a conventional polarizer.

A polarizer is one of crucial components of a liquid crystal displayer. FIG. 1 is a structural diagram of a conventional polarizer. As shown in FIG. 1, the polarizer includes a release film 1, an adhesive layer 2, a first transparent film 3, a polarizing film 4, a second transparent film 5, and a protective film 6, which are sequentially laminated. The first transparent film 3 and the second transparent film 5 are usually made of Tri-cellulose Acetate (abbreviated as TCA), and the polarizing film 4 is usually made of polyvinyl alcohol (PVA). A conventional polarizing film mainly includes an iodine type polarizing film and a dye type polarizing film, where the iodine type polarizing film is formed by stretching polyvinyl alcohol doped with iodine molecules, and the dye type polarizing film is formed by stretching polyvinyl alcohol doped with dichroic organic dye.

A known method for reducing warpage includes: monitoring content proportions of plasticizer in the tri-cellulose acetate films at both sides of the polarizer by a Fourier transform infrared spectroscopy (FTIR), to control production conditions of a polarizer which is not easy to warp. However, the method is unfeasible due to inappropriate sampling positions, and low accuracy limited by error range of instrument.

In addition, another known method includes: attaching TAC films having different warping directions to a polarizing layer; or controlling a film thickness, and controlling a distance between a roller and a laminating roll before lamination to a ratio, and controlling the ratio less than 60, to reduce the warpage of the fabricated polarizer. However, this method is difficult to reproduce well by machines of different brands, due to different operation mechanisms of the machines.

A polarizer is provided according to the disclosure, which includes: a first transparent layer; a second transparent layer, disposed opposite to the first transparent layer; a polarizing layer, disposed between the first transparent layer and the second transparent layer; and a first organic layer disposed between the first transparent layer and the polarizing layer, or a second organic layer disposed between the second transparent layer and the polarizing layer, where a direction of a shrinkage stress of the first organic layer or the second organic layer is perpendicular to a direction of a shrinkage stress of the polarizing layer.

A display panel is provided according to the disclosure, which includes: a first substrate; a second substrate, disposed opposite to the first substrate; a liquid crystal layer, packaged between the first substrate and the second substrate; a first polarizer, disposed on a surface, away from the second substrate, of the first substrate; a second polarizer, disposed on a surface, away from the first substrate, of the second substrate; where a direction of a shrinkage stress of the first polarizer is the same as a direction of a shrinkage stress of the second polarizer.

A display device is further provided according to the disclosure, which includes the aforementioned display panel.

A method for manufacturing a polarizer is further provided according to the disclosure, including: providing a polarizing layer; forming a first organic layer on a surface of the polarizing layer, where a direction of a shrinkage stress of the first organic layer is perpendicular to a direction of a shrinkage stress of the polarizing layer; forming a first transparent layer on a surface, away from the polarizing layer, of the first organic layer; and forming a second transparent layer on another surface of the polarizing layer.

The polarizer according to the disclosure includes a dyed polarizing layer and an undyed first organic layer, where a direction of a shrinkage stress of the first organic layer is perpendicular to a direction of a shrinkage stress of the polarizing layer. In this way, the polarizer is not easy to warp, in the case that an optical effect of the polarizer is not affected. In the case that an outer surface of a display panel is attached with two such polarizers, shrinkage stresses of the two polarizers get balanced, which enables the display panel not apt to warp.

For better understanding of the above purpose, features and advantages of the disclosure, the disclosure is further described in detail in conjunction with drawings and embodiments.

Specific details are set forth in the following description for fully understanding the disclosure. However, the disclosure may be implemented in many other manners different from those described herein, and similar deduction may be made by those skilled in the art without deviating from the spirit of the disclosure. In this way the disclosure is not limited by the embodiments disclosed hereinafter.

Figure 2:
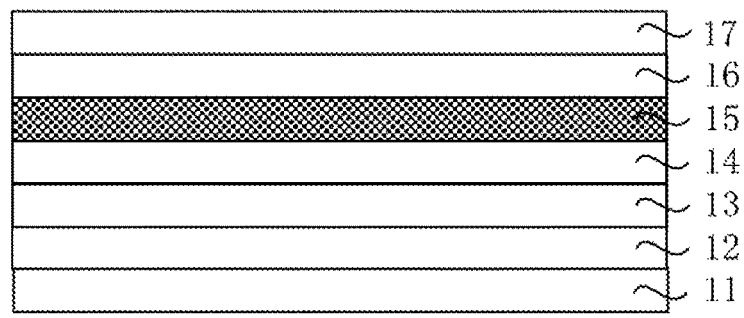
FIG. 2 is a cross-sectional diagram of a polarizer according to an embodiment of the disclosure.

Referring to FIG. 2, a cross-sectional diagram of a polarizer according to the first embodiment of the disclosure is shown.

A polarizer according to the first embodiment of the disclosure includes: a first transparent layer 16; a second transparent layer 13, disposed opposite to the first transparent layer 16; a polarizing layer 15, disposed between the first transparent layer 16 and the second transparent layer 13; a second organic layer 14, disposed between the second transparent layer 13 and the polarizing layer 15, where a direction of a shrinkage stress of the second organic layer 14 is perpendicular to a direction of a shrinkage stress of the polarizing layer 15.

A thickness of the first transparent layer 16 and a thickness of the second transparent layer 13 are both 1-40 um, for example 25 um in this embodiment. Certainly, the thicknesses of the first transparent layer 16 and the second transparent layer 13 may be thinner, and in this way a display panel and a display device are thinner. The first transparent layer 16 and the second transparent layer 13 are made of tri-cellulose acetate, polyethylene terephthalate, or polycarbonate, etc., which are not limited in the embodiment.

It should be further noted that, the polarizing layer 15 is an extended hydrophilic polymer film. In this embodiment, the polarizing layer 15 is for example an iodine-stained polyvinyl alcohol film.

The polarizer according to the first embodiment of the disclosure may further include: a hardened layer 17 on a surface, away from the second transparent layer 13, of the first transparent layer 16. The hardened layer 17 includes one or more of a hard coating, an anti-reflection film, a low-reflection film, an anti-glare film, and an antistatic film. Alternatively, the polarizer may include: an optical layer 17 disposed on a surface, away from the second transparent layer 13, of the first transparent layer 16. The optical layer 17 includes one or more of a reflective film, a semitransparent reflective film, a retardation film, a viewing angle compensation film, and a brightness enhancement film.

The polarizer provided in the first embodiment of the disclosure further includes: adhesive layers (not shown in the figure), where the first transparent layer 16, the second transparent layer 13, the polarizing layer 15, and the second organic layer 14, are adhered via the adhesive layers there between; and a pressure sensitive adhesive layer 12 and a release layer 11 which are disposed on a surface, away from the first transparent layer 16, of the second transparent layer 13, and adapted to fix a display panel subsequently.

The polarizer according to the first embodiment of the disclosure includes a dyed polarizing layer and an undyed second organic layer, where a direction of a shrinkage stress of the second organic layer is perpendicular to a direction of a shrinkage stress of the polarizing layer. In this way, the polarizer is not easy to warp, in the case that an optical effect of the polarizer is not affected. In the case that an outer surface of a display panel is attached with two such polarizers, shrinkage stresses of the two polarizers get balanced, which enables the display panel not apt to warp.

Figure 3:
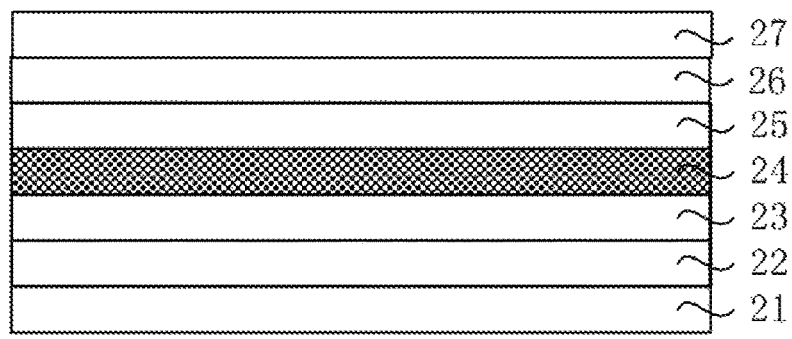
FIG. 3 is a cross-sectional diagram of a polarizer according to an embodiment of the disclosure.

Referring to FIG. 3, a cross-sectional diagram of a polarizer according to the second embodiment of the disclosure is shown.

Figure 4:
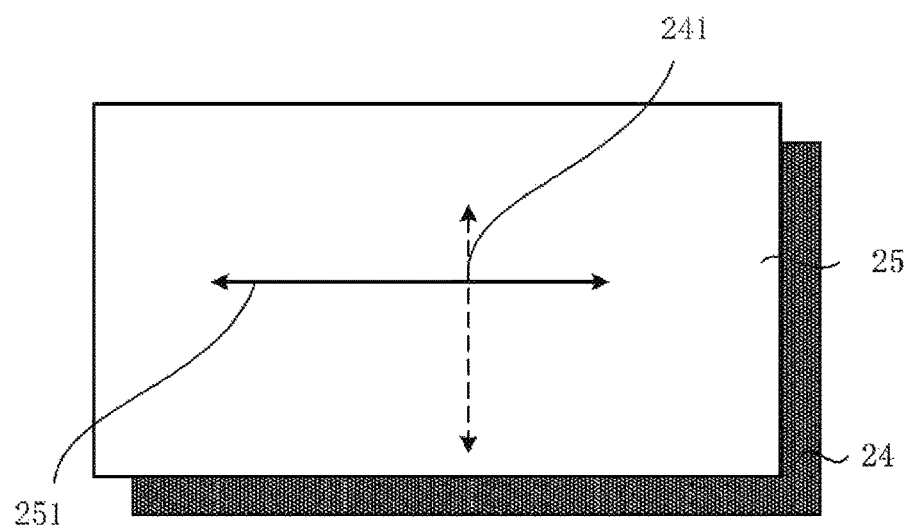
FIG. 4 is a diagram of a shrinkage stress of a polarizer according to an embodiment of the disclosure.

A polarizer according to the second embodiment of the disclosure includes: a first transparent layer 26; a second transparent layer 23, disposed opposite to the first transparent layer 26; a polarizing layer 24, disposed between the first transparent layer 26 and the second transparent layer 23; a first organic layer 25, disposed between the first transparent layer 26 and the polarizing layer 24; where a direction of a shrinkage stress of the first organic layer 25 is perpendicular to a direction of a shrinkage stress of the polarizing layer 24. Referring to FIG. 4, a diagram of a shrinkage stress of the polarizer according to the second embodiment of the disclosure is shown. As shown in FIG. 4, a shrinkage stress 251 of the first organic layer 25 is in a horizontal direction, and a shrinkage stress 241 of the polarizing layer 24 is in a vertical direction. Accordingly, the shrinkage stress 251 of the first organic layer 25 may be in a vertical direction, and the shrinkage stress 241 of the polarizing layer 24 may be in a horizontal direction, as long as the direction of the shrinkage stress of the first organic layer 25 is perpendicular to the direction of the shrinkage stress of the polarizing layer 24.

A thickness of the first transparent layer 26 and a thickness of the second transparent layer 23 are both 1-40 um, for example, 25 um in this embodiment. Certainly, the thicknesses of the first transparent layer 26 and the second transparent layer 23 may be thinner, and in this way a display panel and a display device are thinner. The first transparent layer 26 and the second transparent layer 23 are made of tri-cellulose acetate, polyethylene terephthalate, or polycarbonate, etc., which are not limited in the embodiment.

It should be further noted that, the polarizing layer 24 is an extended hydrophilic polymer film. In this embodiment, the polarizing layer 24 is for example an iodine-stained polyvinyl alcohol film.

The polarizer according to the second embodiment of the disclosure may further include: a hardened layer 27 on a surface, away from the second transparent layer 23, of the first transparent layer 26. The hardened layer 27 includes one or more of a hard coating, an anti-reflection film, a low-reflection film, an anti-glare film, and an antistatic film. Alternatively, the polarizer may include: an optical layer 27 disposed on a surface, away from the second transparent layer 23, of the first transparent layer 26. The optical layer 27 includes one or more of a reflective film, a semitransparent reflective film, a retardation film, a viewing angle compensation film, and a brightness enhancement film.

The polarizer provided in the second embodiment of the disclosure further includes: adhesive layers (not shown in the figure), where the first transparent layer 26, the second transparent layer 23, the first organic layer 25, and the polarizing layer 14 are adhered via the adhesive layers there between; and a pressure sensitive adhesive layer 22 and a release layer 21 which are disposed on a surface, away from the first transparent layer 26, of the second transparent layer 23, and adapted to fix a display panel subsequently.

The polarizer according to the second embodiment of the disclosure includes: a dyed polarizing layer and an undyed first organic layer, where a direction of a shrinkage stress of the first organic layer is perpendicular to a direction of a shrinkage stress of the polarizing layer. In this way, the polarizer is not easy to warp, in the case that an optical effect of the polarizer is not affected. In the case that an outer surface of a display panel is attached with two such polarizers, shrinkage stresses of the two polarizers get balanced, which enables the display panel not apt to warp.

Figure 5:
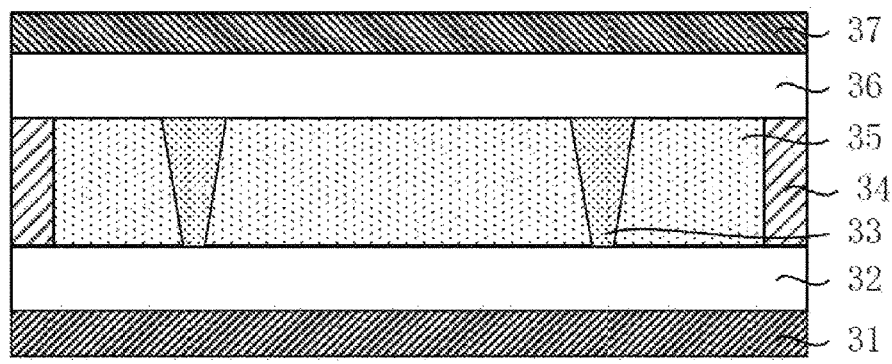
FIG. 5 is a cross-sectional diagram of a display panel including a polarizer according to an embodiment of the disclosure.

Referring to FIG. 5, a cross-sectional diagram of a display panel including the polarizer according to the third embodiment of the disclosure is shown. The display panel according to the third embodiment of the disclosure includes: a first substrate 32; a second substrate 36, disposed opposite to the first substrate 32; a liquid crystal layer 35, packaged between the first substrate 32 and the second substrate 36; a first polarizer 31, disposed on a surface, away from the second substrate 36, of the first substrate 32; a second polarizer 37, disposed on a surface, away from the first substrate 32, of the second substrate 36; where a direction of a shrinkage stress of the first polarizer 31 is the same as a direction of a shrinkage stress of the second polarizer 32.

The display panel according to the third embodiment of the disclosure further includes: a spacer 33, adapted to maintain a distance between the two substrates, and a seal agent 34, adapted to seal the liquid crystal layer 35.

A display device is further according to the third embodiment of the disclosure, including a polarizer described in any one of the foregoing embodiments.

According to the display panel and the display device according to the third embodiment of the disclosure, in the case that an outer surface of the display panel is attached with two such polarizers, a direction of a shrinkage stress of an upper polarizer is the same as a direction of a shrinkage stress of a lower polarizer, the shrinkage stresses of the two polarizers get balanced, and in this way the display panel is not easy to warp.

Figure 6:
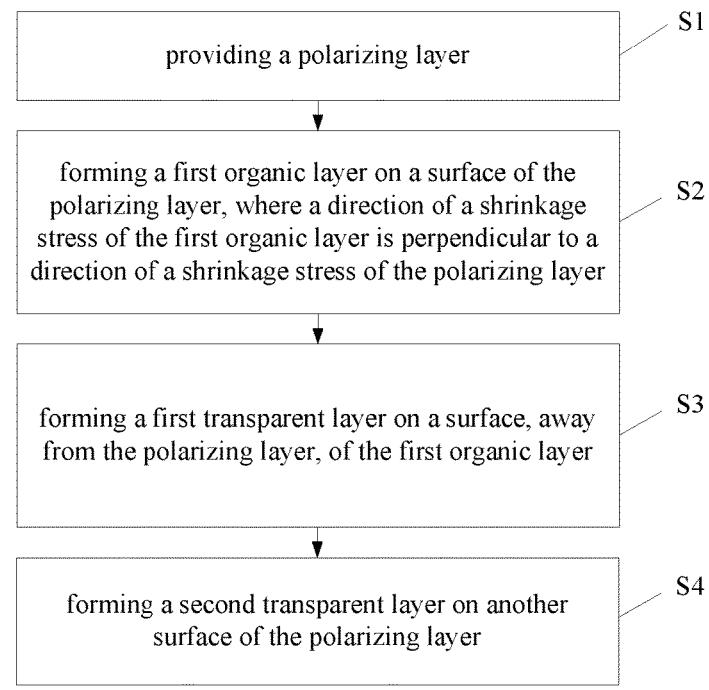
FIG. 6 is a flow chart of a method for fabricating a polarizer according to an embodiment of the disclosure.

Referring to FIG. 6, a flow chart of a method for manufacturing a polarizer is shown according to the fourth embodiment of the disclosure.

The method for manufacturing a polarizer is provided according to the fourth embodiment of the disclosure, which includes steps S1 to S4.

S1 includes: providing a polarizing layer.

S2 includes: forming a first organic layer on a surface of the polarizing layer, where a direction of a shrinkage stress of the first organic layer is perpendicular to a direction of a shrinkage stress of the polarizing layer.

S3 includes: forming a first transparent layer on a surface, away from the polarizing layer, of the first organic layer.

S4 includes: forming a second transparent layer on another surface of the polarizing layer.

The method for manufacturing a polarizer according to the fourth embodiment of the disclosure, further includes:
forming a hardened layer on a surface, away from the second transparent layer, of the first transparent layer, where the hardened layer includes one or more of a hard coating, an anti-reflection film, a low-reflection film, an anti-glare film, and an antistatic film; or
forming an optical layer on a surface, away from the second transparent layer, of the first transparent layer, where the optical layer includes one or more of a reflective film, a semitransparent reflective film, a retardation film, a viewing angle compensation film, and a brightness enhancement film.

In the above fabrication method, the step S1 particularly includes: providing a hydrophilic polymer film; dyeing the hydrophilic polymer film; and extending the dyed hydrophilic polymer film to form the polarizing layer. The step of providing a hydrophilic polymer film, includes: providing a polyvinyl alcohol film. The step of dyeing the hydrophilic polymer film, includes: dipping the hydrophilic polymer film into an aqueous solution; and dipping the hydrophilic polymer film into an aqueous solution containing iodine and boric acid. The step of extending the dyed hydrophilic polymer film to form the polarizing layer, may further includes: providing a first roller to roll out the hydrophilic polymer film, and providing a first pressure roller group to extend the hydrophilic polymer film, where the polarizing layer has a first shrinkage stress by apply stresses to the hydrophilic polymer film via the first roller and the first pressure roller group respectively.

Figure 7:
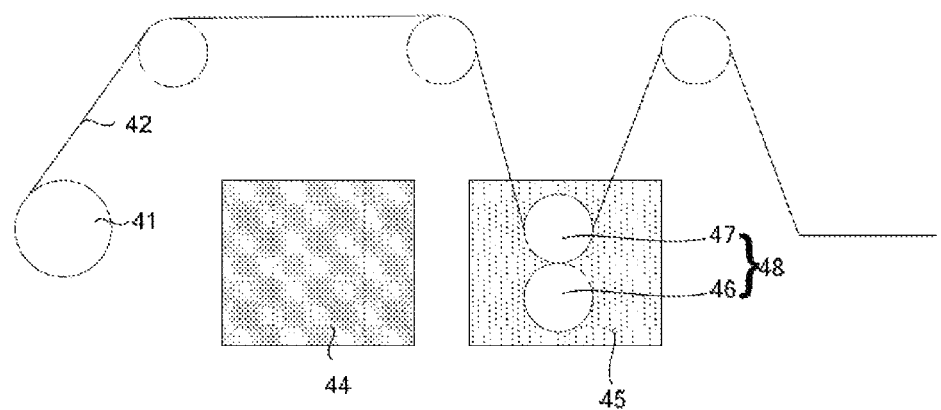
FIG. 7 is a flow chart of forming the first organic layer in an embodiment of the disclosure.

The step S2 particularly includes: providing a hydrophilic polymer film; and extending the hydrophilic polymer film to form the first organic layer. The step of providing a hydrophilic polymer film, includes: providing a polyvinyl alcohol film. Referring to FIG. 7, the step of extending the hydrophilic polymer film to form the first organic layer. FIG. 7 is a flow chart of forming the first organic layer according to the fourth embodiment of the disclosure. Particularly, this step includes: providing a second roller 41 to roll out the hydrophilic polymer film 42, and providing a second pressure roller group 48 to extend the hydrophilic polymer film 42, where the first organic layer has a second shrinkage stress by applying stresses to the hydrophilic polymer film 42 via the second roller 41 and the second pressure roller group 48 respectively, and where a direction of the second shrinkage stress is perpendicular to a direction of the first shrinkage stress of the polarizing layer.

The steps for implementing the first organic layer may be referred to particular implementations of the steps S3 and S4.

It should be note that the first transparent layer and the second transparent layer are made of tri-cellulose acetate, polyethylene terephthalate, or polycarbonate.

The method for manufacturing a polarizer according to the fourth embodiment of the disclosure, further includes: forming sequentially a pressure sensitive adhesive layer and a release layer on a surface, away from the first transparent layer, of the second transparent layer.

The polarizer according to the fourth embodiment of the disclosure includes: a dyed polarizing layer and an undyed first organic layer, where a direction of a shrinkage stress of the first organic layer is perpendicular to a direction of a shrinkage stress of the polarizing layer. In this way, the polarizer is not easy to warp, in the case that an optical effect of the polarizer is not affected. In the case that an outer surface of a display panel is attached with two such polarizers, shrinkage stresses of the upper polarizer and the lower polarizer get balanced, which enables the display panel not apt to warp.

The above content is more detailed description of the disclosure in conjunction with particular embodiments. However, particular implementations should not be identified merely limited to the description. For those skilled in the art the discloser pertains, any simple deduction or substitution performed without departing from the idea of the disclosure should be deemed within the scope of the disclosure.

The invention claimed is:

1. A polarizer, comprising:
a first transparent layer;
a second transparent layer;
a polarizing layer, disposed between the first transparent layer and the second transparent layer; and
a first organic layer disposed between the first transparent layer and the polarizing layer,
wherein a direction of a shrinkage stress of the first organic layer is perpendicular to a direction of a shrinkage stress of the polarizing layer.

2. The polarizer according to claim 1, wherein a thickness of the first transparent layer and a thickness of the second transparent layer are both 1-40 um.

3. The polarizer according to claim 1, wherein the first transparent layer and the second transparent layer comprises tri-cellulose acetate, polyethylene terephthalate, or polycarbonate, wherein the polarizing layer is an extended hydrophilic polymer film.

4. The polarizer according to claim 1, further comprising:
a hardened layer on a surface away from the second transparent layer of the first transparent layer, wherein the hardened layer comprises a hard coating, an anti-reflection film, a low-reflection film, an anti-glare film, an antistatic film, or
an optical layer disposed on a surface away from the second transparent layer of the first transparent layer, wherein the optical layer comprises a reflective film, a semitransparent reflective film, a retardation film, a viewing angle compensation film, or a brightness enhancement film.

5. The polarizer according to claim 1, further comprising: adhesive layers, wherein the first transparent layer, the second transparent layer, the polarizing layer, the first organic layer are adhered via the adhesive layers.

6. The polarizer according to claim 1, further comprising: a pressure sensitive adhesive layer and a release layer on a surface away from the first transparent layer of the second transparent layer.

7. A display panel, comprising:
a first substrate;
a second substrate, disposed opposite to the first substrate;
a liquid crystal layer, sealed between the first substrate and the second substrate;
a first polarizer, disposed on a surface away from the second substrate of the first substrate;
a second polarizer, disposed on a surface away from the first substrate of the second substrate;
wherein a direction of a shrinkage stress of the first polarizer is the same as a direction of a shrinkage stress of the second polarizer,
wherein both the first polarizer and the second polarizer comprise:
a first transparent layer;
a second transparent layer;
a polarizing layer, disposed between the first transparent layer and the second transparent layer; and
a first organic layer disposed between the first transparent layer and the polarizing layer,
wherein a direction of a shrinkage stress of the first organic layer is perpendicular to a direction of a shrinkage stress of the polarizing layer.

8. A method for manufacturing a polarizer, comprising:
providing a polarizing layer;
forming a first organic layer on a surface of the polarizing layer, wherein a direction of a shrinkage stress of the first organic layer is perpendicular to a direction of a shrinkage stress of the polarizing layer;
forming a first transparent layer on a surface away from the polarizing layer of the first organic layer; and
forming a second transparent layer on another surface of the polarizing layer.

9. The method according to claim 8, further comprising:
forming a hardened layer on a surface, away from the second transparent layer, of the first transparent layer, wherein the hardened layer comprises a hard coating, an anti-reflection film, a low-reflection film, an anti-glare film, or an antistatic film.

10. The method according to claim 8, further comprising:
providing a hydrophilic polymer film;
dyeing the hydrophilic polymer film; and
extending the dyed hydrophilic polymer film to form the polarizing layer.

11. The method according to claim 10, wherein providing a hydrophilic polymer film, comprises: providing a polyvinyl alcohol film.

12. The method according to claim 10, wherein dyeing the hydrophilic polymer film, comprises:
dipping the hydrophilic polymer film into an aqueous solution; and
dipping the hydrophilic polymer film into an aqueous solution containing iodine and boric acid.

13. The method according to claim 10, wherein extending the dyed hydrophilic polymer film to form the polarizing layer, comprises: providing a first roller to roll out the hydrophilic polymer film, and providing a first pressure roller group to extend the hydrophilic polymer film, wherein the polarizing layer has a first shrinkage stress by apply stresses to the hydrophilic polymer film via the first roller and the first pressure roller group respectively.

14. The method according to claim 13, wherein forming a first organic layer on a surface of the polarizing layer, comprises:
providing a hydrophilic polymer film; and
extending the hydrophilic polymer film to form the first organic layer.

15. The method according to claim 14, wherein providing a hydrophilic polymer film, comprises: providing a polyvinyl alcohol film.

16. The method according to claim 14, wherein extending the hydrophilic polymer film to form the first organic layer, comprises: providing a second roller to roll out the hydrophilic polymer film, and providing a second pressure roller group to extend the hydrophilic polymer film, wherein the first organic layer has a second shrinkage stress by applying stresses to the hydrophilic polymer film via the second roller and the second pressure roller group respectively, wherein a direction of the second shrinkage stress is perpendicular to a direction of the first shrinkage stress of the polarizing layer.

17. The method according to claim 8, wherein the first transparent layer and the second transparent layer comprises tri-cellulose acetate, polyethylene terephthalate, or polycarbonate.

18. The method according to claim 8, further comprising: forming a hardened layer on a surface away from the second transparent layer of the first transparent layer, wherein the hardened layer comprises a hard coating, an anti-reflection film, a low-reflection film, an anti-glare film, or an antistatic film.

19. The method according to claim 8, further comprising: forming an optical layer on a surface away from the second transparent layer of the first transparent layer, wherein the optical layer comprises a reflective film, a semitransparent reflective film, a retardation film, a viewing angle compensation film, or a brightness enhancement film.

20. The method according to claim 8, further comprising: forming sequentially a pressure sensitive adhesive layer and a release layer on a surface away from the first transparent layer of the second transparent layer.

* * * * *